United States Patent
Wu et al.

(10) Patent No.: US 9,605,656 B2
(45) Date of Patent: Mar. 28, 2017

(54) ROTOR ASSEMBLY, ELECTROMECHANICAL TRANSDUCER AND WIND TURBINE

(71) Applicant: SIEMENS AKTIENGESELLSCHAFT, München (DE)

(72) Inventors: Lijian Wu, Ikast (DK); Zi-Qiang Zhu, Sheffield (GB)

(73) Assignee: SIEMENS AKTIENGESELLSCHAFT (DE)

( * ) Notice: Subject to any disclaimer, the term of this patent is extended or adjusted under 35 U.S.C. 154(b) by 140 days.

(21) Appl. No.: 14/547,269

(22) Filed: Nov. 19, 2014

(65) Prior Publication Data
US 2015/0200572 A1    Jul. 16, 2015

(30) Foreign Application Priority Data
Jan. 15, 2014    (EP) .................................... 14151293

(51) Int. Cl.
*H02K 1/27*    (2006.01)
*F03D 9/00*    (2016.01)
(Continued)

(52) U.S. Cl.
CPC ............... *F03D 9/002* (2013.01); *F03D 1/00* (2013.01); *H02K 1/278* (2013.01); *H02K 1/28* (2013.01);
(Continued)

(58) Field of Classification Search
CPC .. F03D 1/00; F03D 9/002; H02K 1/28; H02K 1/278; H02K 1/276
(Continued)

(56) References Cited

U.S. PATENT DOCUMENTS 5,191,256 A * 3/1993 Reiter, Jr. ............ H02K 1/2726
310/156.38
6,252,323 B1 * 6/2001 Nishikawa ............. H02K 1/278
310/112
(Continued)

FOREIGN PATENT DOCUMENTS

EP    1363381 A1    11/2003
EP    2164154 A1    3/2010
(Continued)

OTHER PUBLICATIONS

EP Search Report for EP application No. 14151293.98, mailed on Jul. 23, 2014.

*Primary Examiner* — Naishadh Desai
(74) *Attorney, Agent, or Firm* — Schmeiser Olsen & Watts LLP

(57) ABSTRACT

A rotor assembly for an electromechanical transducer is provided. The rotor assembly comprises a mechanical support structure and a magnet arrangement having a first magnetic component part and a second magnetic component part. The first magnetic component part and the second magnetic component part are attached to the mechanical support structure and are arranged along an axial direction (Z) of the rotor assembly. With respect to the axial direction a first cross section of the first magnetic component part has a first shape and a second cross section of the second magnetic component part has a second shape being different from the first shape. It is further described an electromechanical transducer and a wind turbine, which are both equipped with such a rotor assembly.

8 Claims, 8 Drawing Sheets

(51) Int. Cl.
  *F03D 1/00*    (2006.01)
  *H02K 1/28*    (2006.01)
  *H02K 7/18*    (2006.01)

(52) U.S. Cl.
  CPC ....... *H02K 7/1838* (2013.01); *H02K 2201/06* (2013.01); *H02K 2213/12* (2013.01); *Y02E 10/721* (2013.01); *Y02E 10/725* (2013.01)

(58) Field of Classification Search
  USPC .......................... 310/156.44–156.47, 156.43, 310/156.36–156.38
  See application file for complete search history.

(56) References Cited

U.S. PATENT DOCUMENTS

| | | | | |
|---|---|---|---|---|
| 6,867,524 B2* | 3/2005 | Liang | ..................... | H02K 1/278 310/156.43 |
| 7,906,880 B2* | 3/2011 | Okubo | .................... | H02K 1/278 310/156.25 |
| 7,928,622 B2* | 4/2011 | Okubo | .................... | H02K 1/278 310/156.25 |
| 8,397,369 B2* | 3/2013 | Smith | ................... | H02K 1/2766 29/596 |
| 2006/0163963 A1* | 7/2006 | Flores | ..................... | F03D 1/025 310/115 |
| 2010/0156227 A1* | 6/2010 | Hung | ..................... | H02K 21/16 310/156.38 |
| 2012/0133232 A1* | 5/2012 | Kimiabeigi | .............. | H02K 1/17 310/156.49 |

FOREIGN PATENT DOCUMENTS

| | | |
|---|---|---|
| EP | 2211442 A1 | 7/2010 |
| EP | 2615721 A1 | 7/2013 |
| JP | 2003339129 A | 11/2003 |

\* cited by examiner

ROTOR ASSEMBLY, ELECTROMECHANICAL TRANSDUCER AND WIND TURBINE

CROSS-REFERENCE TO RELATED APPLICATIONS

This application claims priority to EP Application No. 14151293, having a filing date of Jan. 15, 2014, the entire contents of which are hereby incorporated by reference.

FIELD OF TECHNOLOGY

The following relates to the technical field of electromechanical transducers having a rotor which comprises permanent magnets. In particular, the present invention relates to a rotor assembly for an electromechanical transducer such as a synchronous machine. Further, the present invention relates to an electromechanical transducer and to a wind turbine, which are both equipped with such a rotor assembly.

BACKGROUND

Electromechanical transducers are machines, which convert electrical energy into mechanical energy or vice versa. An electric motor is a widely used electromechanical transducer that converts electrical energy into mechanical energy using magnetic field linkage. An electric generator is an electromechanical transducer that converts mechanical energy into electrical energy also using a magnetic field linkage.

An electromechanical transducer comprises a stator and a rotor. The stator is an assembly, which represents the stationary part of an electromechanical transducer. The rotor is an assembly, which represents the moving part of an electromechanical transducer.

In order to realize a magnetic field linkage permanent magnets may be used in particular for a rotor of an electromechanical transducer. In recent years, especially since the introduction of rare-earth magnetic materials, permanent magnet (PM) electromechanical transducers have become popular since they eliminate the need for commutator and brushes, which are commonly used with conventional Direct Current (DC) electromechanical transducer. The absence of an external electrical rotor excitation eliminates losses on the rotor and makes permanent magnet electromechanical transducers more efficient. Further, the brushless design of a PM electro-mechanical transducer allows conductor coils to be located exclusively in the stationary stator. In this respect it is mentioned that non-PM electromechanical transducers, which are equipped with commutators and brushes, are susceptible to significantly higher maintenance costs.

PM electromechanical transducers are also known for their durability, controllability, and absence of electrical sparking. Thanks to their advantages the PM electromechanical transducers are widely used in many applications such as electric vehicles (electromechanical transducer is a motor) or in power generation systems (electromechanical transducer is a generator) such as for instance a wind turbine.

One technical problem of PM electromechanical transducers is cogging torque. Cogging torque is produced between the rotor mounted permanent magnets and the stator due to a meeting of "sharp edges" of the rotor magnets and stator coils when the PM electromechanical transducer is in operation. Cogging torque is an undesired effect that contributes to an output ripple (also called torque ripple), to vibrations, and to noise in an electromechanical transducer.

It is known that skewing of the rotor magnets can reduce or nearly eliminate cogging torque in permanent magnet electric machines. For instance U.S. Pat. No. 6,867,524 B2 discloses a permanent magnet motor comprising a rotor having at least three segments. Each of the three segments is formed sequentially adjacent and aligned along an axis of the rotor. Each segment has at least one pair of permanent magnets disposed at a substantially equal interval in a peripheral direction of the rotor. First and second segments are skewed relative to each other by a first angular displacement, and the first and third segments are skewed relative to each other by a second angular displacement. The first and second angular displacements are selected to cause a net sum of torque ripple produced by each of the segments to be substantially equal to zero during an operation of the motor.

However, when realizing a skewed arrangement of permanent magnets at a mechanical support structure of a rotor assembly for an electro-mechanical transducer, a correct mechanical mounting and alignment of the permanent magnets is challenging and time consuming.

A further disadvantage of skewing permanent magnets is the matter of fact that most skewing patterns produce an unwanted axial force on the rotor assembly. Such an axial force is detrimental to acoustic noise, to the vibrational behavior, and to the lifetime of bearings.

There may be a need for providing a rotor assembly for a permanent magnet electric machine, which can be configured for a mechanically easy manner and which causes a reduced generation of axial forces acting on the rotor assembly when the permanent magnet electric machine is in operation.

SUMMARY

According to a first aspect of the embodiment of the invention there is provided a rotor assembly for an electromechanical transducer. The provided rotor assembly comprises (a) a mechanical support structure and (b) a magnet arrangement having (b1) a first magnetic component part and (b2) a second magnetic component part, wherein the first magnetic component part and the second magnetic component part are attached to the mechanical support structure and are arranged along an axial direction of the rotor assembly. With respect to the axial direction (i) a first cross section of the first magnetic component part has a first shape and (ii) a second cross section of the second magnetic component part has a second shape being different from the first shape.

The described rotor assembly is based on the idea that by shaping the magnet arrangement along the axial direction cogging torque and torque ripples of an electric (synchronous) machine being equipped with the described rotor assembly can be reduced in an easy and effective manner. In this respect "shaping the magnet arrangement along the axial direction" means that the cross sectional shape and/or the cross sectional size of the magnet arrangement varies along the axial direction. This cross sectional size variation is preferably configured for a first magnet arrangement being inserted within one (longitudinal) slot of the support structure but with at least two and preferably all magnet arrangements each being inserted within one particular (longitudinal) slot of the support structure. Thereby, each slot may be preferably oriented parallel to the axial direction. This means that there is no skewing of the magnetic component parts.

However, although causing an increased effort for manufacturing the support structure a slightly slanted orientation of the slots with respect to the axial direction may be possible for instance in order to realize a well-known skewing configuration for the magnet arrangement (in addition to shaping the magnet arrangements along the axial direction). Such an additional skewing may further contribute to a reduction of cogging torque and torque ripples.

In this document the term "axial direction" refers to the direction around which the rotational axis of the rotor assembly, when being in operation within an electric machine, rotates.

The term "with respect to the axial direction" may particularly mean that a first normal vector (of a first cross sectional area) of the first cross section and a second normal vector (of a second cross sectional area) of the second cross section are aligned parallel to the axial direction. In other words, the cutting plane yielding each one of the two cross sections is oriented perpendicular to the axial direction.

The magnetic arrangement or the magnetic component parts may be preferably attached to the support structure by means of an engagement within a longitudinal slot. Thereby, as has already been mentioned above, the longitudinal slot may preferably be aligned parallel to the axial direction or may alternatively be slightly slanted against the axial direction. The engagement can be configured to means of appropriate undercuts into which the respective magnet arrangement can engage. Thereby, the engagement can be configured to directly between the magnetic material of the magnet arrangement respectively of the magnetic component parts and the undercuts. However, preferably the engagement is configured to indirectly by means of at least one appropriate support plate of the magnet arrangement respectively of the magnetic component parts.

According to an embodiment of the invention the first shape is a first geometrically irregular shape and/or the second shape is a second geometrically irregular shape.

In this respect the term "geometrically irregular shape" may mean in particular that the respective shape has no symmetry axis with respect to which the "geometrically regular shape" exhibits an axis-symmetry.

In case the first cross section and/or the second cross section is a quadrangle a "geometrically irregular shape" may mean that at least two inner angles of the quadrangle are different with respect to each other and are different with respect to a third or the fourth angle of the quadrangle. Further, a "geometrically irregular shape" of a quadrangle may mean that all four sides have a different length.

In case the first cross section and/or the second cross section is triangle "geometrically irregular shape" may mean that all angles of the triangle are different.

Descriptively speaking, when the first shape and/or the second shape is a geometrically irregular shape the magnet arrangement is not only shaped along the axial direction but also along the radially outer circumferential direction. This may lead to a further reduction of cogging torque and/or torque ripple.

In this respect it is pointed out that the first cross section and/or the second cross section may also have other shapes as compared to a quadrangle or triangle. Also a shape having N corners may be possible, whereby N is an integer number greater than four.

Further, the first cross section and/or the second cross section may have a shape which is bordered not exclusively with straight lines but with at least one curved line. This means that the first magnetic component part and/or the second magnetic component part may have a rounded surface. Preferably, this rounded surface is an outer rounded surface which is provided at a side of the magnet arrangement which side faces away from the mechanical support structure.

According to a further embodiment of the invention the magnet arrangement comprises a mounting structure having a contour and the mechanical support structure comprises a complementary mounting structure having a complementary contour with respect to the contour. The complementary contour is engaged with the contour. This may provide the advantage that the magnet arrangement and the mechanical support structure can be mechanically connected to each other in a reliable manner without using any specific tools such as for instance a screwdriver or a spanner. Further, the resulting mechanical connection is detachable, which can be of great importance if it becomes necessary that one or more of the magnetic component parts have to be replaced by other magnetic component parts.

When manufacturing the rotor assembly the magnetic component parts may be inserted into a groove or put onto a protrusion of the mechanical support structure in a slidable manner, wherein the groove or the protrusion extend preferably in the axial direction of the rotor assembly.

According to a further embodiment of the invention the contour and/or the complementary contour is formed in a dove tail manner. This may provide the advantage that the magnetic component parts can be aligned correctly with the support structure. Further, a dove tail shape or any similar geometric form may ensure a mechanically reliable fastening of the magnetic component part with the mechanical support structure of the rotor assembly.

According to a further embodiment of the invention the magnet arrangement is configured in a monolithic manner.

In other words, both the first magnetic component part and the second magnetic component part are formed as a common magnetic block. This may provide the advantage that assembling the mechanical support structure with the first magnetic component part and with the second magnetic component part will be facilitated because it is not necessary to handle the at least two magnetic component parts individually or separately.

According to a further embodiment of the invention the first magnetic component part and the second magnetic component part are separate magnetic pieces or elements. This may provide the advantage that the magnet arrangement can be configured and manufactured in a simple and easy manner. Thereby, the first magnetic component part and/or the second magnetic component part may be configured in a monolithic manner. In this respect it is pointed out that the monolithic realization may apply only to the magnetic material of the respective magnetic component part and that of course the respective magnetic component may comprise another element such as for instance a base plate to which the magnetic material attached (e.g. by a glue).

According to a further embodiment of the invention the first magnetic component part and/or the second magnetic component part have a constant cross sectional shape along the axial direction. This may provide the advantage that the manufacture of the respective magnetic component part will be facilitated.

According to a further embodiment of the invention the first magnetic component part and/or the second magnetic component part have a varying cross sectional shape along the axial direction. This may provide the advantage that sharp edges of the magnetic material of the magnet arrangement along the axial direction will be avoided. As a consequence, cogging torque and/or torque ripples can be further reduced.

According to a further embodiment of the invention the magnet arrangement further comprises at least one further magnetic component part, wherein the further magnetic component part (a) is attached to the mechanical support structure, (b) is arranged along the axial direction with respect to the first magnetic component part and the second magnetic component part, and (c) is located in between the first magnetic component part and the second magnetic component part. With respect to the axial direction a third cross section of the at least one further magnetic component part has a third shape and the third shape is different at least from the second shape. This may mean that the shaping of the magnet arrangement with respect to the axial direction can be configured to a more variable manner. As a consequence, cogging torque and/or torque ripples can be further reduced.

According to a further embodiment of the invention with respect to the second magnetic component part the magnet arrangement comprises a symmetry along the axial direction.

In other words, the first magnetic component part and the further magnetic component part may have the same shape. As a consequence, for building up the magnet arrangement or the whole rotor assembly the number of different magnetic component parts can be kept to a minimum. This facilitates the production of the rotor assembly in particular with respect to logistic aspects such as the necessary stock of products.

According to a further aspect of the invention there is provided an electromechanical transducer. The provided electromechanical transducer comprises (a) a stator assembly and (b) a rotor assembly as described above.

The provided electromechanical transducer is based on the idea that with the above described rotor assembly comprising at least one magnet arrangement having a shaped configuration along the axial direction and optionally also along the circumferential direction an output ripple caused by cogging torque and/or torque ripples can be significantly reduced.

The described electromechanical transducer may be a synchronous machine and in particular a synchronous electric generator.

According to a further aspect of the invention there is provided a wind turbine for generating electrical power. The provided wind turbine comprises (a) a tower, (b) a nacelle which is arranged at a top end of the tower, (c) a rotor which is arranged at a front end of the nacelle and which comprises at least one blade, and (d) an electromechanical transducer as described above. The electromechanical transducer is mechanically coupled with the rotor.

It has to be noted that embodiments of the invention have been described with reference to different subject matters. In particular, some embodiments have been described with reference to apparatus type claims being directed to a rotor assembly whereas other embodiments have been described with reference to apparatus type claims being directed to an electromechanical transducer and to a wind turbine. However, a person skilled in the art will gather from the above and the following description that, unless other notified, in addition to any combination of features belonging to one type of subject matter also any combination of features between features relating to different subject matters is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

Figure 3A:
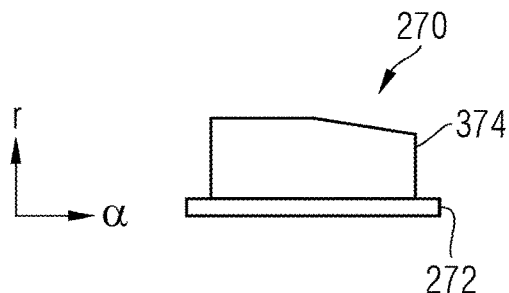
Figure 3B:
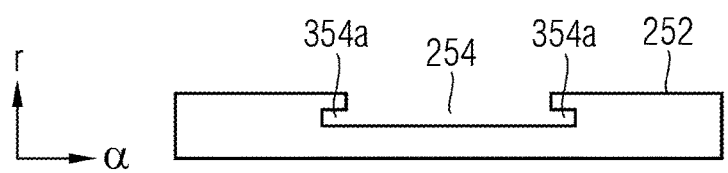
Figure 3C:
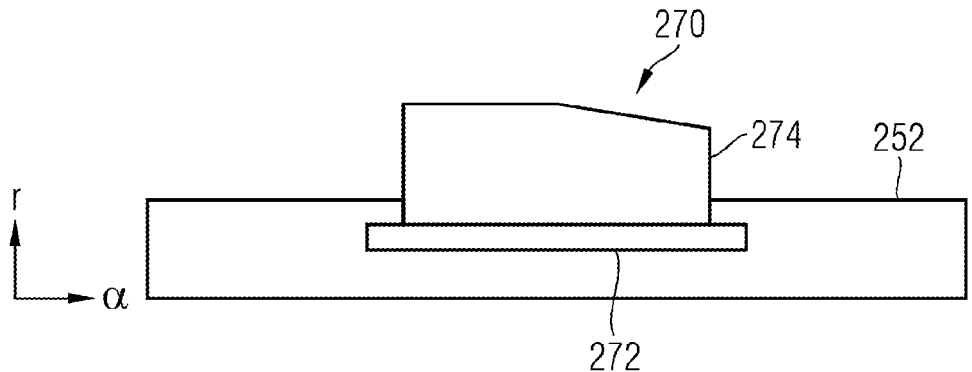
Figure 4:
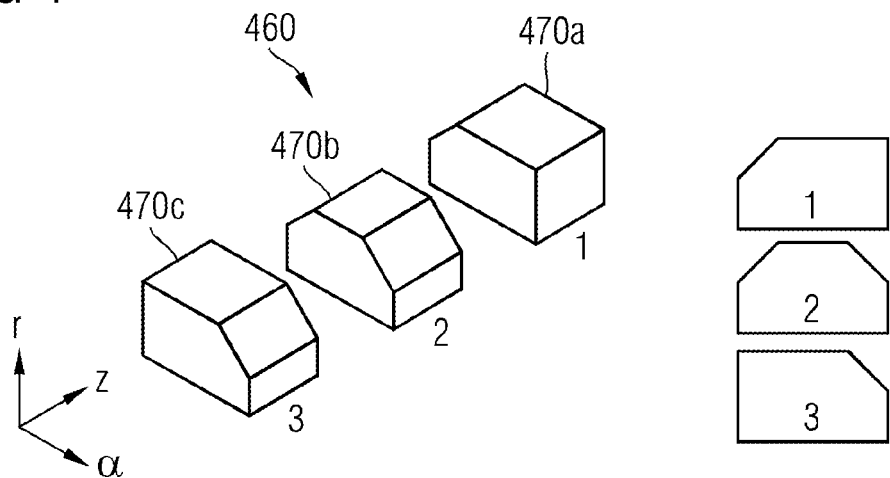
Figure 5A:
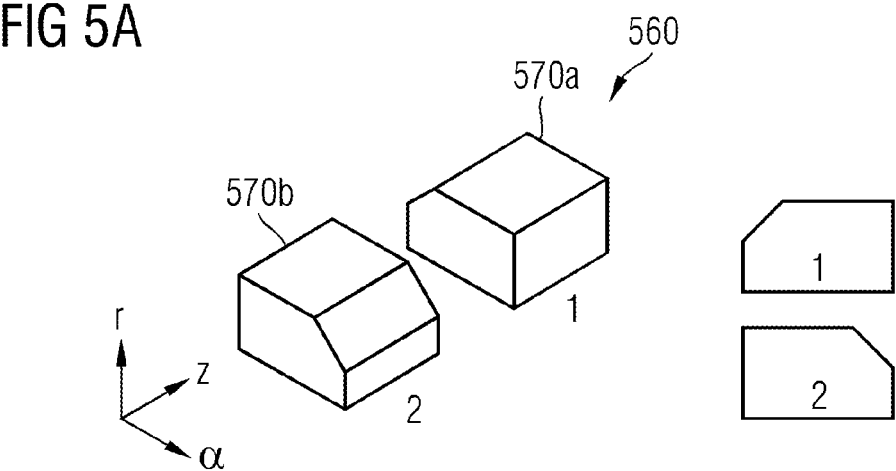
Figure 5B:
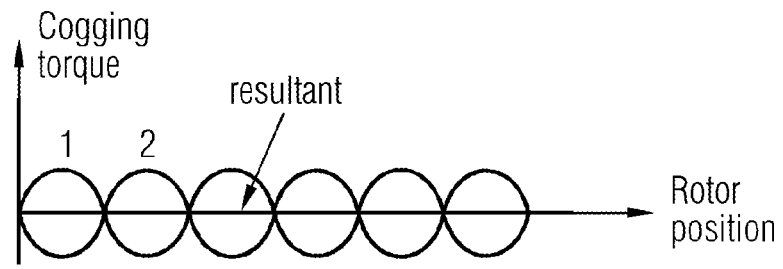
Figure 5C:
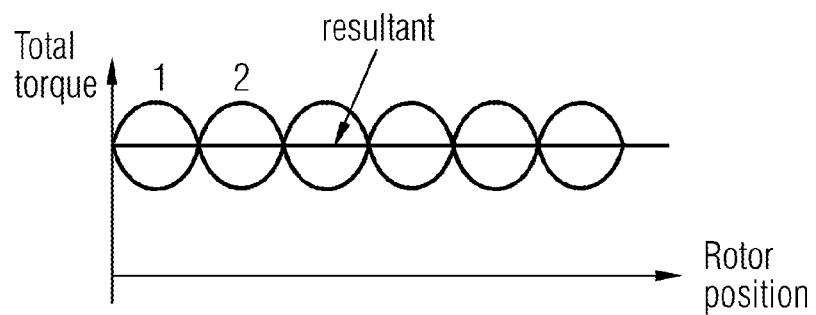
Figure 6A:
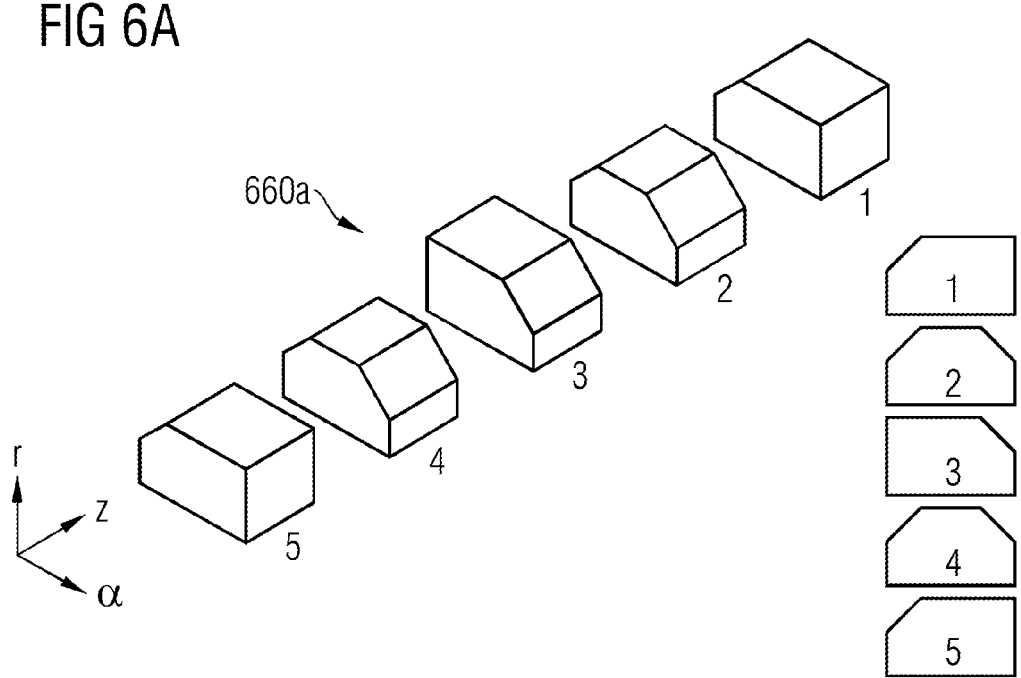
Figure 6B:
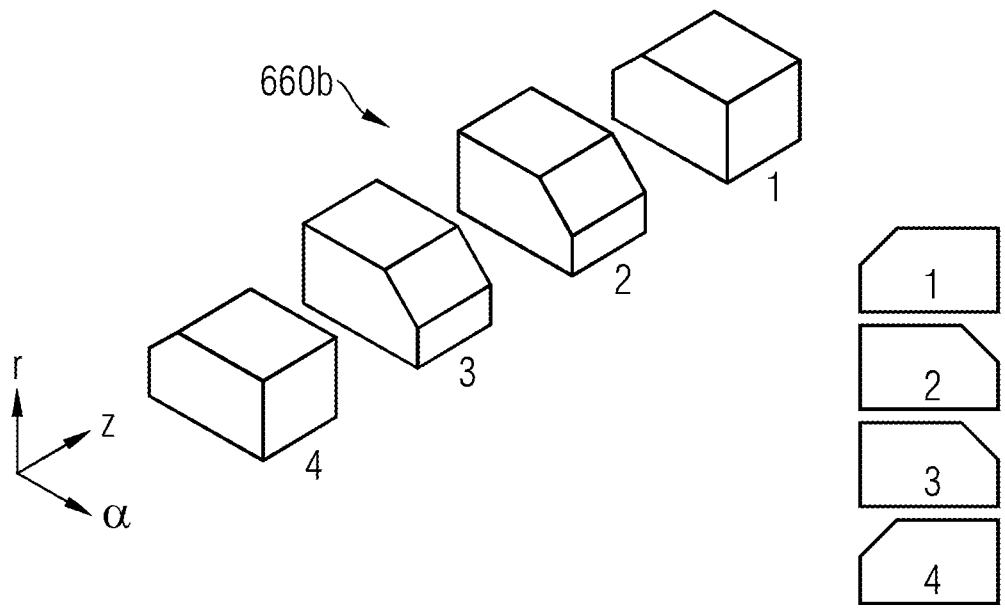
Figure 6C:
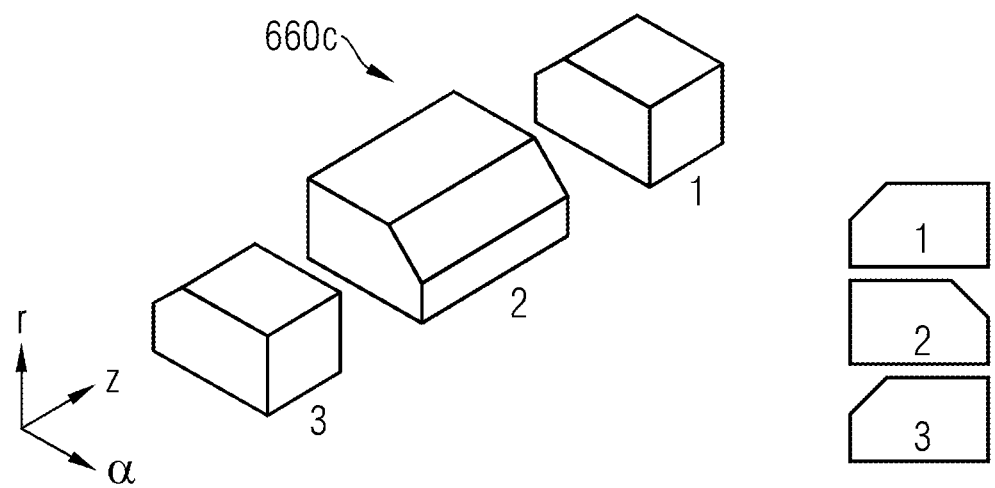
Figure 7A:
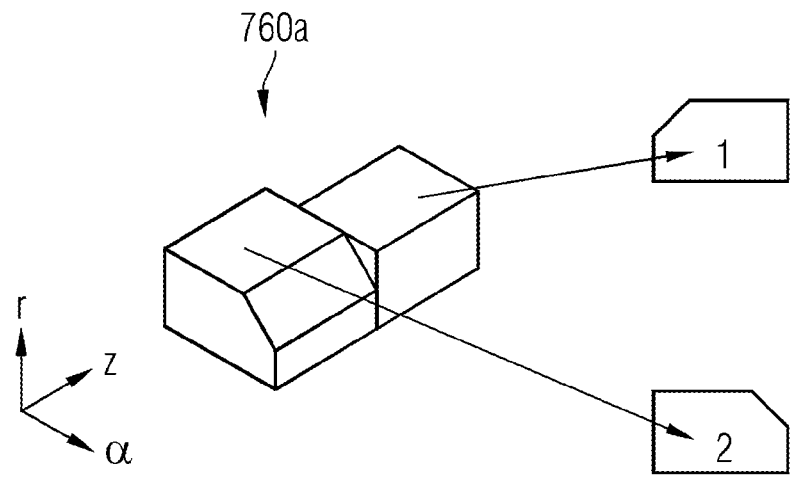
Figure 7B:
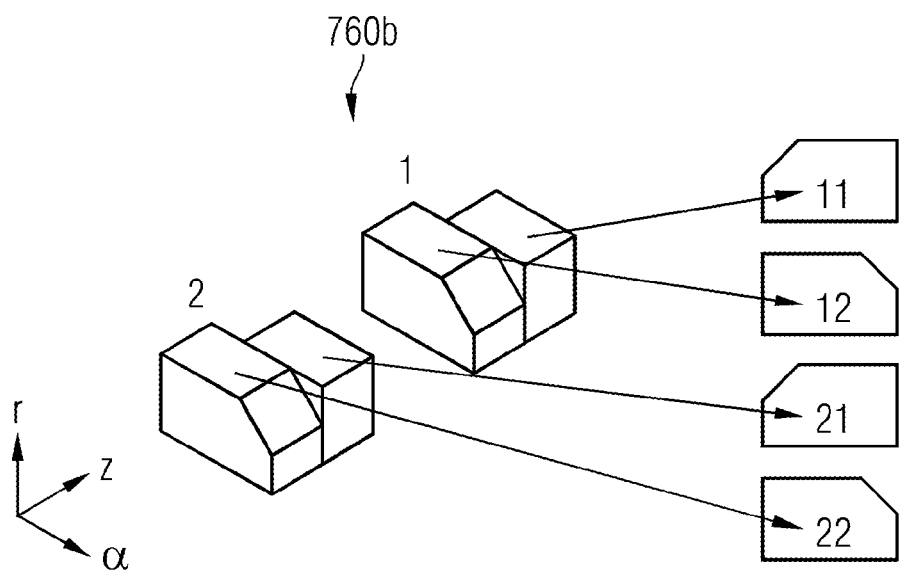
Figure 8A:
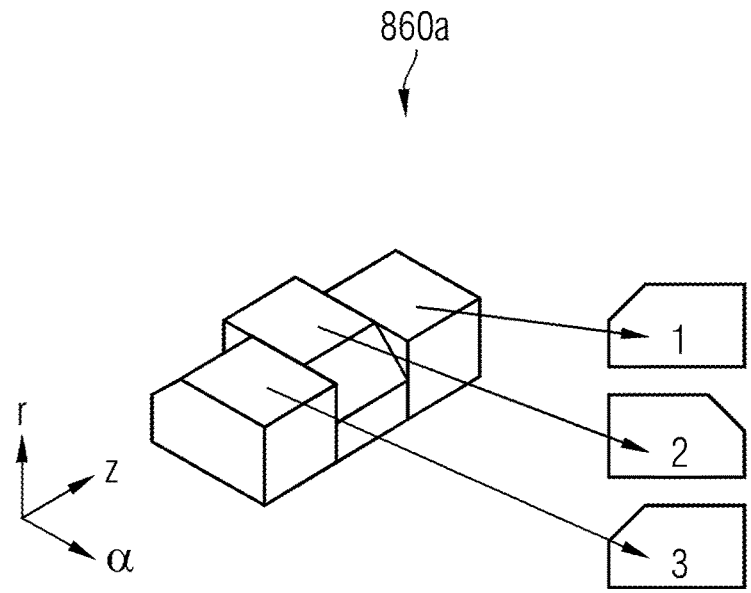
Figure 8B:
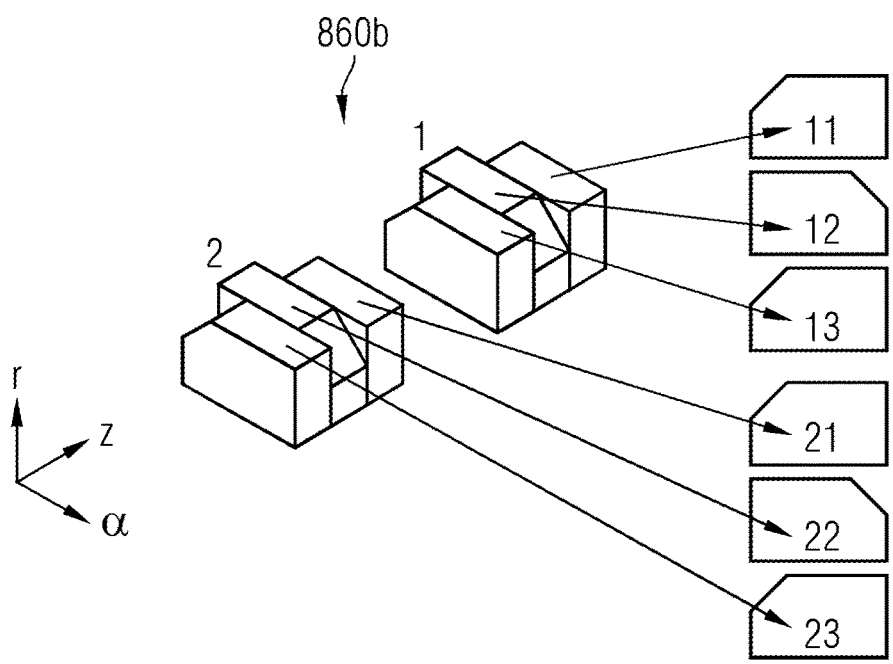
Figure 9:
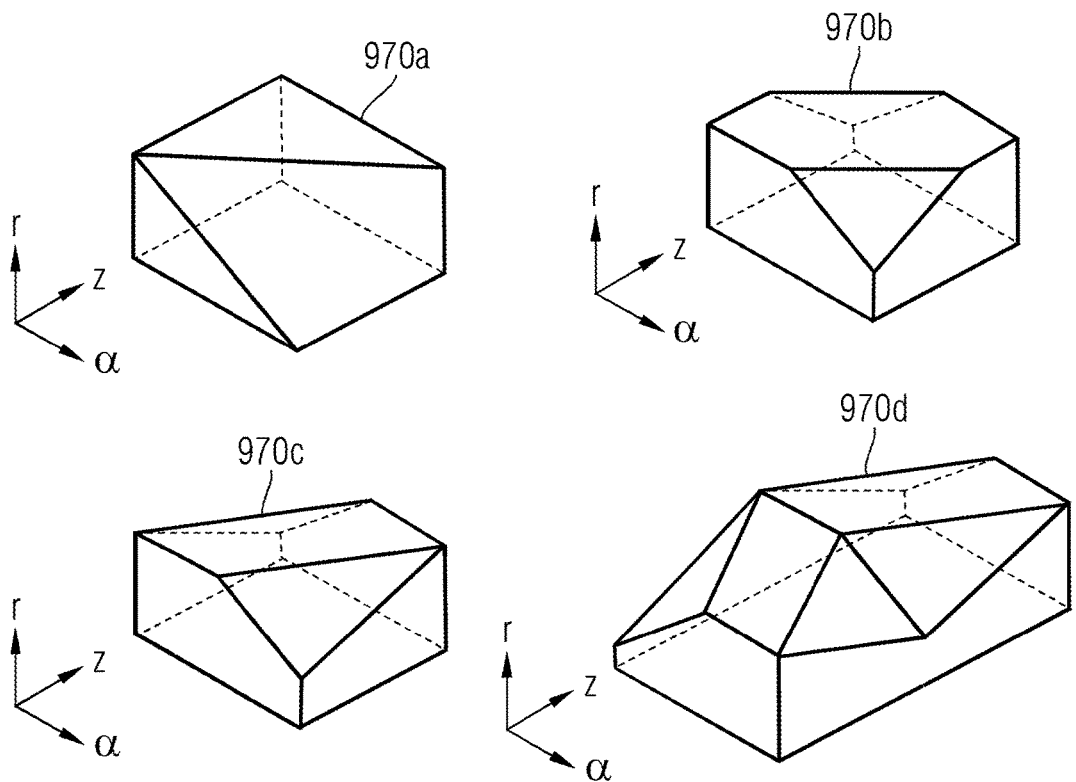
Figure 10:
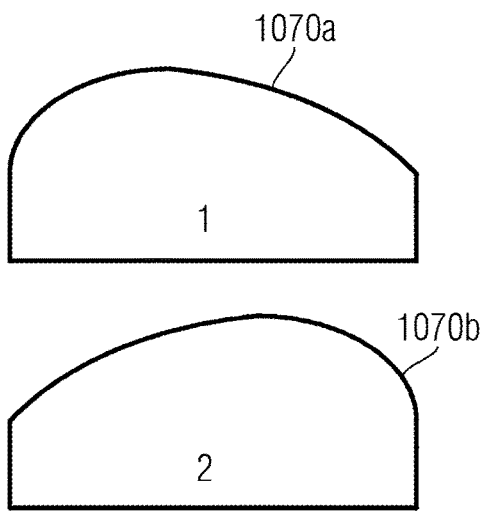

FIGS. 3a, 3b, and 3c illustrate the engaging attachment of a magnetic component part into a slot of the mechanical support structure;

FIG. 4 shows a magnet arrangement comprising three differently shaped magnetic component parts;

FIG. 5a shows a magnet arrangement comprising two differently shaped magnetic component parts, FIGS. 5b and 5c illustrate the cancellation of cogging torque and torque ripple for the magnet arrangement shown in FIG. 5a;

FIGS. 6a, 6b, and 6c show magnet arrangements exhibiting an axial symmetry with five magnetic component parts, four magnetic component parts, and three magnetic component parts, respectively;

FIGS. 7a and 7b show a magnet arrangement having two respectively four magnetic component parts, wherein respectively two magnetic component parts are formed integrally by one magnet piece;

FIGS. 8a and 8b show a magnet arrangement having three respectively six magnetic component parts, wherein respectively three magnetic component parts are formed integrally by one magnet piece;

FIG. 9 shows four different geometries for a magnetic component part having a gradually varying cross section; and FIG. 10 shows two cross sectional shapes for a magnetic component part, which cross sectional shapes has a rounded edge resulting in a smooth bended surface of the respective magnetic component part.

DETAILED DESCRIPTION

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 1:
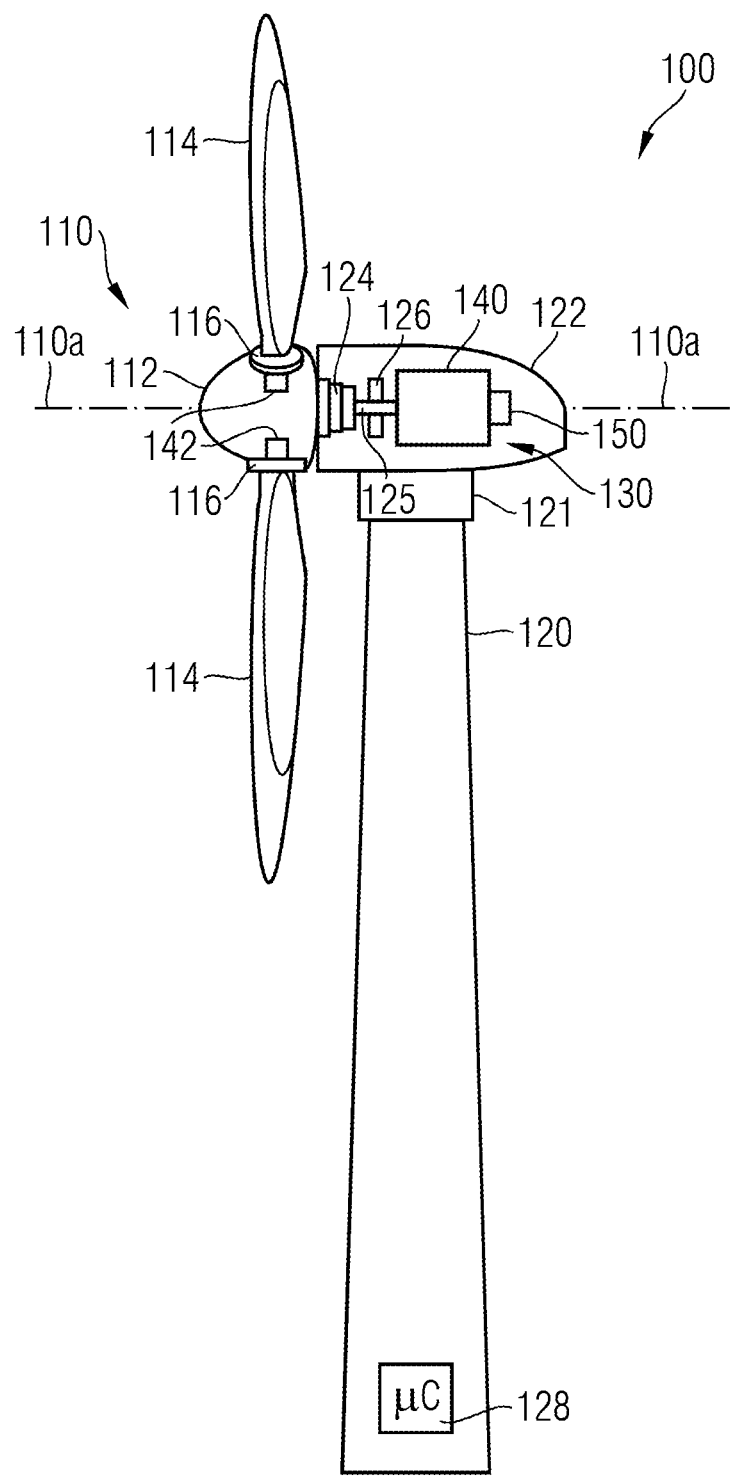
FIG. 1 shows a wind turbine according to an embodiment of the present invention.

FIG. 1 shows a wind turbine 100 according to an embodiment of the invention. The wind turbine 100 comprises a tower 120, which is mounted on a non-depicted fundament. On top of the tower 120 there is arranged a nacelle 122. In between the tower 120 and the nacelle 122 there is provided a yaw angle adjustment device 121, which is capable of rotating the nacelle 122 around a non-depicted vertical axis being aligned with the longitudinal extension of the tower 120. By controlling the yaw angle adjustment device 121 in an appropriate manner it can be made sure, that during a normal operation of the wind turbine 100 the nacelle 122 is always properly aligned with the current wind direction. However, the yaw angle adjustment device 121 can of course also be used to adjust the yaw angle to a position, wherein the nacelle 122 is intentionally not perfectly aligned with the current wind direction. Such a situation might occur if the wind driving the wind turbine is so strong that there is a risk of damaging a component of the wind turbine 100.

The wind turbine 100 further comprises a rotor 110 having three blades 114. In the perspective of FIG. 1 only two blades 114 are visible. The rotor 110 is rotatable around a rotational axis 110*a*. The blades 114, which are mounted at a hub 112, extend radially with respect to the rotational axis 110*a*. Of course, also a rotor having a different number of blades may be used for the wind turbine.

In between the hub 112 and a blade 114 there is respectively provided a blade adjustment device 116 in order to adjust the blade pitch angle of each blade 114 by rotating the respective blade 114 around a non-depicted axis being aligned substantially parallel with the longitudinal extension of the blade 114. By controlling the blade adjustment device 116 the blade pitch angle of the respective blade 114 can be adjusted in such a manner that at least when the wind is not so strong a maximum wind power can be retrieved from the available wind power. However, the blade pitch angle can also be intentionally adjusted to a position, in which only a reduced wind power can be captured. This might be the case if the wind driving the wind turbine 100 is so strong that there is a risk of damaging in particular the rotor 110 of the wind turbine 100.

As can be seen from FIG. 1, within the nacelle 122 there is provided an optional gear box 124. The gear box 124 may be used for converting the number of revolutions of the rotor 110 into a higher number of revolutions of a shaft 125, which is coupled in a known manner to an electromechanical transducer 130. The electromechanical transducer is a generator 130.

Further, a brake 126 is provided in order to stop the operation of the wind turbine 100 or to reduce the rotational speed of the rotor 110 for instance (a) in case of an emergency, (b) in case of too strong wind conditions, which might harm the wind turbine 100, and/or (c) in case of an intentional saving of the consumed fatigue life time and/or the fatigue life time consumption rate of at least one structural component of the wind turbine 100.

The wind turbine 100 further comprises a control system 128 for operating the wind turbine 100 in a highly efficient manner. Apart from controlling for instance the yaw angle adjustment device 121 the depicted control system 128 is also used for adjusting the blade pitch angle of the rotor blades 114 in an optimized manner.

In accordance with basic principles of electrical engineering the generator 130 comprises a stator assembly 140 and a rotor assembly 150. The stator assembly 140 comprises a plurality of coils for generating electrical current in response to a time alternating magnetic flux. The rotor assembly 150 comprises a plurality of magnet arrangements which are shaped along an axial direction of the generator 130. This axial direction corresponds to the orientation of the rotational axis 110*a*. By shaping the magnet arrangements along the axial direction a cogging torque and/or torque ripples which occur when the generator 130 is in operation can be reduced.

Figure 2:
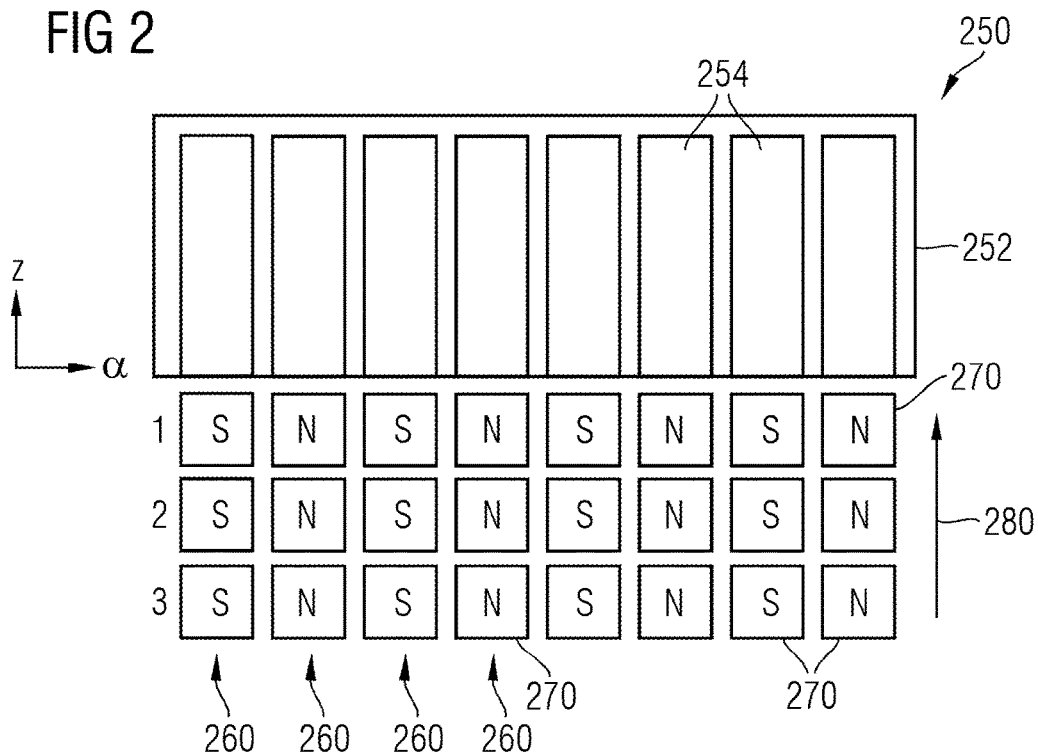
FIG. 2 shows a rotor assembly in a representation, wherein the mechanical support structure of the rotor assembly is rolled out along a circumferential direction.

FIG. 2*a* shows a rotor assembly 250 in a representation, wherein a mechanical support structure 252 of the rotor assembly 250 is rolled out along a circumferential direction a of the rotor assembly 250. The rotor assembly 250 comprises a plurality of slots 254, which are oriented along an axial direction Z of the rotor assembly 250. This means that the slots 254 are not skewed. The rotor assembly 250 comprises a plurality of magnet arrangements 260. According to the embodiment described here each magnet arrangement 260 comprises three magnetic component parts 270, which can be inserted along an insertion direction 280 into the respective slot 254. As can be seen from FIG. 2, in one slot the magnetic component parts 270 are inserted with their north pole N at the upper side and in the neighboring slot the magnetic component parts 270 are inserted with their south pole S at the upper side.

FIGS. 3*a*, 3*b*, and 3*c* illustrate the engaging attachment of a magnetic component part 270 into a slot 254 of the mechanical support structure 252.

As can be seen from FIG. 3*a*, according to the embodiment described here the magnetic component part 270 comprises a base element or base plate 372. At the base element or base plate 372 there is attached, e.g. by means of an appropriate glue, a magnet piece 374. The magnet piece 374 is a permanent magnet (PM) such as for instance a rare earth PM. In accordance with embodiments of the invention the magnet piece 374 has a cross sectional shape having the form of an irregular quadrangle.

As can be seen from FIG. 3*b*, according to the embodiment described here the slot 254 comprises two undercuts 354*a* which are formed within the mechanical support structure 252.

As can be seen from FIG. 3*c*, when inserting the magnetic component parts 270 into respective slot 254, the edges of the base plate 372 engage with the two undercuts 354*a*.

In the following there will be described several geometric configurations for magnet arrangements which, when being attached to a mechanical support structure of a rotor assembly, yield a reduced cogging torque and/or reduced torque ripples when the rotor assembly is in operation.

FIG. 4 shows in a perspective view a magnet arrangement 460 comprising three differently shaped magnetic component parts, a first magnetic component part 470*a*, a second magnetic component part 470*b* and a third magnetic component part 470*c*. In connection with the perspective view the axial direction Z of the magnet arrangement 460, the circumferential direction a and the radial direction r of the not depicted corresponding rotor assembly are indicated.

In FIG. 4 the three magnetic component parts are numbered with 1, 2, and 3. Due to the different geometries of the three magnetic component parts 470*a*, 470*b*, and 470*c* (the respective cross sections are indicated on the right side of this Figure) the magnet arrangement 460 consisting of the three magnetic component parts 470*a*, 470*b*, and 470*c* comprises a shape variation or a shaping along the axial direction Z. Such a shape variation leads to a reduction of cogging torque and/or torque ripples even if there is no skewing of the magnetic component parts 470*a*, 470*b*, and 470*c*.

FIG. 5*a* shows a magnet arrangement 560 in accordance with another embodiment of the invention. The magnet arrangement 560 comprises two differently shaped magnetic component parts, a first magnetic component part 570*a* and a second magnetic component part 570*b*. Again, due to the different geometries of the two magnetic component parts 570*a* and 570*b* (the respective cross sections are indicated on the right side of this Figure), the magnet arrangement 560 consisting of the two magnetic component parts 570*a* and 570*b* comprises a shape variation along the axial direction Z.

FIGS. 5*b* and 5*c* illustrate the cancellation of cogging torque and torque ripple for the magnet arrangement shown in FIG. 5*a*. As can be seen from FIG. 5*b*, as a function of the rotor position or the rotor angle the cogging torque caused by the first magnetic component part 570*a* (denominated with "1") is in anti-phase with the cogging torque caused by the second magnetic component part 570*b* (denominated with "2"). Therefore, these two cogging torques cancel each other. The resultant cogging torque, which is a superposition of the two cogging torques, shows no dependency on the rotor position and is depicted in FIG. 5*b* as a straight line. As can be seen from FIG. 5*c*, the same holds for the total torque.

In this respect it is mentioned that the magnet arrangements 460 and 560 shown in the FIGS. 4 and 5*a* are not symmetrical along the axial direction. This may cause an axial force acting on the rotor assembly when the rotor assembly is in operation. In order to eliminate this axial force, the magnet arrangement should be designed in such a manner that it comprises a symmetry along the axial direction. Examples for axially symmetric magnet arrangement are elucidated in the following with respect to the FIGS. 6*a*, 6*b*, and 6*c*.

FIG. 6*a* shows an axially symmetric magnet arrangement 660*a* consisting of five magnetic component parts. FIG. 6*b* shows an axially symmetric magnet arrangement 660*b* consisting of four magnetic component parts. FIG. 6*c* shows an axially symmetric magnet arrangement 660*c* consisting of three magnetic component parts.

FIG. 7*a* shows a magnet arrangement 760*a* comprising two differently shaped magnetic component parts which are formed integrally or monolithically within a single magnet piece. FIG. 7*b* shows a magnet arrangement 760*b* having four magnetic component parts. Respectively two magnetic component parts of the four magnetic component parts are formed integrally or monolithically by one single magnet piece. As can be seen from the FIGS. 7*a* and 7*b*, both of the two magnet arrangements 760*a* and 760*b* have no symmetry along the axial direction. As has already been mentioned above, this may lead to an axial force acting on the respective rotor assembly when being operated in a rotary electric machine.

FIG. 8*a* shows a magnet arrangement 860*a* having three magnetic component parts which are formed integrally or monolithically within a single magnet piece. FIG. 8*b* shows a magnet arrangement 860*b* having six magnetic component parts. Respectively three magnetic component parts of the six magnetic component parts are formed integrally or monolithically by one single magnet piece. As can be seen from the FIGS. 8*a* and 8*b*, both of the two magnet arrangements 860*a* and 860*b* exhibit a symmetry along the axial direction. As a result of this axial symmetry there is no axial force acting on the respective rotor assembly when being operated in a rotary electric machine.

According to the embodiments described above each magnetic component part has a constant cross section along the axial direction Z. As a consequence, each magnet arrangement comprises at least two magnetic component parts each with a different cross section which has several sections of different cross-sections. This applies both for the embodiments where each magnet arrangement comprises separate magnetic component part and for the embodiments where different magnetic component parts are formed integrally. However, the embodiment of the invention and its positive effects (i.e. the reduction of cogging torque and/or torque ripples) may also be achieved with magnetic component parts having gradually varying cross section along the axial direction Z.

FIG. 9 shows four different magnetic component parts, a magnetic component part 970*a*, a magnetic component part 970*b*, a magnetic component part 970*c*, and a magnetic component part 970*d*. All these magnetic component parts have a gradually varying cross section along the axial direction.

According to the embodiments described above the cross section of the magnetic component parts is always formed by straight lines. However, the cross section can have many other shapes.

FIG. 10 shows as an example two magnetic component parts 1070*a* and 1070*b*, which both have a cross sectional shape with a rounded edge on their upper side. This rounded edge results in a smooth bended surface of the magnetic component part 1070*a* and 1070*b*, respectively.

The new design for the magnet arrangement described in this document may provide inter alia the following advantages:

(A) The cogging torque and torque ripple of a rotary electric machine can be reduced without skewing the positions of the magnetic component parts. Hence, the new design can be easily implemented.

(B) An axial force acting on the rotor assembly can be removed by symmetrically arranging magnetic component parts of different shapes along the axial direction. Thereby, the magnetic component parts may be arranged at the same angular position of the rotor assembly (i.e. there is no need for skewing the magnetic component parts). Hence, a rotor assembly taking benefit from the new design is much easier to manufacture. In particular, the slots which are used to fix the magnetic component part can be straight respectively can be oriented parallel to the axial direction.

(C) There is no need to employ the skewing technique to reduce cogging torque and/or torque ripple. Since the skewing technique reduces the so called back electromagnetic force (back-EMF) the efficiency for an electromechanical transducer having a skewed arrangement of the magnetic component parts is reduced due to the skewing. On the contrary, the new design proposed in this document has less influence on the efficiency because all axial magnetic component parts are at the same circumferential position.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A rotor assembly for an electromechanical transducer, the rotor assembly comprising:
  a mechanical support structure; and
  a magnet arrangement having:
    (i) a first magnetic component part; and
    (ii) a second magnetic component part, wherein the first magnetic component part and the second magnetic component part are attached to the mechanical support structure and are arranged along an axial direction of the rotor assembly, wherein
  with respect to the axial direction of the rotor assembly;
    (a) a first cross section of the first magnetic component part has a first shape; and
    (b) a second cross section of the second magnetic component part has a second shape being different from the first shape and wherein the first magnetic component part and/or the second magnetic component part have a gradually varying cross sectional shape along an axial and radially outer circumferential direction of the first and the second shapes, wherein the first shape is positioned next to the second shape and wherein the first and the second shapes are both on the same parallel axis in the axial direction of the rotor assembly, wherein the first shape is a first geometrically irregular shape and the second shape is a second geometrically irregular shape and wherein the first magnetic component part and the second magnetic component part are separate magnetic pieces.

2. The rotor assembly as set forth in claim 1, wherein the magnet arrangement comprises a mounting structure having a contour and the mechanical support structure comprises a complementary mounting structure having a complementary contour with respect to the contour, wherein the complementary contour is engaged with the contour.

3. The rotor assembly as set forth in claim 2, wherein the contour and/or the complementary contour is formed in a dove tail manner.

4. The rotor assembly as set forth in claim 1, wherein the first magnetic component and second magnetic component part form a magnet arrangement which is realized in a monolithic manner.

5. The rotor assembly as set forth in claim 1, wherein the magnet arrangement further comprises:

at least one further magnetic component part, wherein the at least one further magnetic component part (a) is attached to the mechanical support structure, (b) is arranged along the axial direction with respect to the first magnetic component part and the second magnetic component part, and is located in between the first magnetic component part and the second magnetic component part, wherein with respect to the axial direction a third cross section of the at least one further magnetic component part has a third shape and the third shape is different at least from the second shape.

6. The rotor assembly as set forth in claim 5, wherein with respect to the second magnetic component part the magnet arrangement comprises a symmetry along the axial direction.

7. An electromechanical transducer comprising:
a stator assembly and
a rotor assembly as set forth in claim 1.

8. A wind turbine for generating electrical power, the wind turbine comprising:
a tower,
a nacelle which is arranged at a top end of the tower,
a rotor which is arranged at a front end of the nacelle and which comprises at least one blade, and
an electromechanical transducer as set forth in claim 7, wherein the electromechanical transducer is mechanically coupled with the rotor.

* * * * *